United States Patent Office  3,491,120
Patented Jan. 20, 1970

3,491,120
PRODUCTION OF α,α-DISUBSTITUTED-
β-PROPIOLACTONES
Masataka Nakahara, Takatsuki, Yasuhiro Ogawa, Suita, Yasuhiro Iizuka, Toyonaka, and Yoshihiro Osada, Takasago, Japan, assignors to Kanegafuchi Boseki Kabushiki Kaisha
No Drawing. Filed May 26, 1967, Ser. No. 641,456
Claims priority, application Japan, June 3, 1966, 41/35,986
Int. Cl. C07d 3/00
U.S. Cl. 260—343.9                4 Claims

ABSTRACT OF THE DISCLOSURE

There is provided a process for the preparation of α,α-disubstituted-β-propiolactones of the general formula $$\begin{array}{c} R_2 \\ \diagdown \\ C \!-\!-\! C \!=\! O \\ \diagup \quad | \\ R_3 \quad CH_2 \!-\! O \end{array}$$

characterized by the thermal decomposition or pyrolysis of β-acyloxy-α,α-disubstituted-propionic acids of the general formula $$R_1COOCH_2\!-\!\underset{R_3}{\overset{R_2}{\underset{|}{C}}}\!-\!COOH$$

wherein
   $R_1$ represents hydrogen or an alkyl group of 1 to 2 carbon atoms,
   $R_2$ represents an alkyl group of 1 to 4 carbon atoms, and
   $R_3$ represents an alkyl group of 1 to 4 carbon atoms or phenyl.

The reaction is conducted in the presence of a catalyst from the group of metal carbonates, metal hydrogen carbonates (metal bicarbonates) and metal hydroxides.

---

The present invention relates to a process for preparing α,α-disubstituted-β-propiolactones of the general formula:

(I)
$$\begin{array}{c} R_2 \\ \diagdown \\ C \!-\!-\! C \!=\! O \\ \diagup \quad | \\ R_3 \quad CH_2 \!-\! O \end{array}$$

characterized by the thermal decomposition or pyrolysis of β-acyloxy-α,α-disubstituted-propionic acids of the general formula:

(II)
$$R_1COOCH_2\!-\!\underset{R_3}{\overset{R_2}{\underset{|}{C}}}\!-\!COOH$$

wherein $R_1$ represents a hydrogen atom or an alkyl group of 1 to 2 carbon atoms, $R_2$ represents an alkyl group of 1 to 4 carbon atoms and $R_3$ represents an alkyl group of 1 to 4 carbon atoms or phenyl group, in the presence of a catalyst selected from the group consisting of metal carbonates, metal hydrogen carbonates (metal bicarbonates) and metal hydroxides.

The α,α-disubstituted-β-propiolactones are useful in the high polymer industry as the starting material of synthetic resins and synthetic fibers and also in the pharmaceutical industry and have been heretofore prepared by a variety of methods. For example, in the specification of U.S. Patent No. 2,356,459 there is described the well-known method for preparing α,α-dimethyl-β-propiolactone by the addition reaction of dimethylketone and formaldehyde, and also in the specification of German Patent No. 1,167,809 there is described a method for preparing the said lactone by reacting monohalopivalic acid with an equimolar amount of a metal base at 100 to 300° C. in a solvent of a high boiling point. In addition, in the specification of Canadian Patent No. 549,347 there is described a method for preparing α,α-bis(chloromethyl)-β-propiolactone by thermal decomposition of silver β,β',β''-trichloropivalate.

However, these known methods can be practiced on an industrial scale only with difficulties and involve many economical disadvantages.

We have discovered a simple process for preparing α,α-disubstituted-β-propiolactone which is essentially different from the above-mentioned methods. Thus, we have found that the decarboxylation by the thermal decomposition of β-acyloxy-α,α-disubstituted-propionic acid results in the formation of α,α-disubstituted-β-propiolactone.

We have also found that this decarboxylating thermal decomposition is promoted when conducted in the presence of a catalyst selected from the group consisting of metal carbonate, metal hydrogen carbonates (metal bicarbonates) and metal hydroxides.

The reaction of this invention may be illustrated by the following equation:

$$R_1COOCH\!-\!\underset{R_3}{\overset{R_2}{\underset{|}{C}}}\!-\!COOH \xrightarrow{\text{(catalyst)}} R_1COOH + \begin{array}{c} R_2 \\ \diagdown \\ C \!-\!-\! C \!=\! O \\ \diagup \quad | \\ R_3 \quad CH_2 \!-\! O \end{array}$$

(II)                                           (I)

In the above formulae, $R_1$ represents a hydrogen atom or an alkyl group of 1 to 2 carbon atoms, $R_2$ represents an alkyl group of 1 to 4 carbon atoms and $R_3$ represents an alkyl group of 1 to 4 carbon atoms or phenyl group.

The reaction of the present invention producing α,α-disubstituted-β-propiolactones (hereinafter referred to as "β-lactone") from β-acyloxy-α,α-disubstituted-propionic acids may be carried out in a gaseous phase. Thus the reaction is practiced by passing the starting material, preferably under reduced pressure, through a layer of the catalyst kept at a high temperature. The process is advantageous in that the reactant and the product are kept at the high temperature only for a short time, the concentration of the reactant is low and the continuous operation is possible.

Example of the starting propionic acids of the Formula II are β-formyloxy-α,α-dimethylpropionic acid, β-formyloxy - α,α - diethylpropionic acid, β-formyloxy-α-butyl-α-phenylpropionic acid, β - formyloxy-α-ethyl-α-propylpropionic acid, β-formyloxy-α-propyl-α-phenylpropionic acid, β-formyloxy-α,α-dipropylpropionic acid, β-formyloxy-α-propyl-α-butylpropionic acid, β-formyloxy-α,α-dibutylpropionic acid, β-formyloxy-α-methyl-α-phenylpropionic acid, β - formyloxy-α-ethyl-α-phenylopropionic acid, β-acetoxy-α,α-dimethylpropionic acid, β-acetoxy-α,α-diethylpropionic acid, β-acetoxy-α-methyl-α-ethylpropionic acid, β-acetoxy-α - methyl-α-propylpropionic acid, β-propionyloxy-α,α-dimethylpropionic acid, β-propionyloxy-α-methyl-α-propylpropionic acid, β-acetoxy-α-methyl-α-butylpropionic acid, β-acetoxy-α-methyl-α-phenylpropionic acid, β-acetoxy-α-ethyl-α-butylpropionic acid, β-acetoxy-α-ethyl-α-phenylpropionic acid, β - propionyloxy - α,α-dimethylpropionic acid, β-propionyloxy-α-methyl-α-ethylpropionic acid, etc.

Examples of the β-lactones of the Formula I to be obtained by the method of this invention are α,α-dimethyl β - propiolactone, α - methyl-α-ethyl-β-propiolactone, α-methyl-α-propyl-β-propiolactone, α,α-diethyl-β-propiolactone, α - ethyl-α-propyl-β-propiolactone, α,α-dipropyl-β-propiolactone, α - propyl-α-butyl-β-propiolactone, α,α-di-butyl-β-propiolactone, α-ethyl-α-butyl-β-propiolactone, α-methyl - α - phenyl-β-propiolactone, α-ethyl-α-phenyl-β-propiolactone, α - methyl-α-butyl-β-propiolactone, α,α-di-ethyl - β-propiolactone, α-ethyl-α-propyl-β-propiolactone, α-ethyl-α-butyl-β-propiolactone, α-propyl-α-phenyl-β-propiolactone, α-butyl-α-phenyl-β-propiolactone, etc.

The reaction temperature of the present process should be determined depending on the kind of the catalyst, and also on the pressure, contact time, etc. and may range from 100 to 500° C., preferably from 200 to 400° C. Generally, the reaction does not proceed when the temperature is too low, while side reaction increases when the temperature is too high.

The present reaction may be carried out preferably under reduced pressure. The pressure significantly affects the reaction and has connection with change of the produced β-lactone. The pressure may range usually from 1 to 760 mm. Hg, preferably from 5 to 100 mm. Hg.

In the present reaction, a carrier gas may also be employed. In this case, an inert gas like nitrogen or carbon dioxide which is inert to the reactant and stable at the given temperature is effective.

According to the invention particular catalyst is used in carrying out the reaction. The catalyst is selected from the group of carbonates, hydrogen carbonates (bicarbonates) and hydroxides of such metals as lithium, sodium, potassium, rubidium, cesium, barium, strontium, calcium, etc.

The catalyst which may be suitably deposited on or shaped with a carrier such as pumice, celite silica gel, diatomaceous earth and is packed or arranged in the form of a fixed-bed or fluidized-bed.

The contact time in the present gas-phase catalystic reaction is not critical and may vary depending on the reaction temperature, pressure and the kind of the catalyst used. However, it is generally preferably that the contact time is relatively short, and it may range from 0.01 to 1 second, most preferably about 0.1 second.

Since the thus-produced β-lactone is easily changed under the present reaction conditions, it is desirable that the said β-lactone is quickly cooled. The thus-obtained product may be fractionated and rectificated under reduced pressure to obtain the β-lactone of high purity, and this can be utilized for polymerization and other applications.

As shown above, the process for preparing the said β-lactones by thermal decomposition or gas-phase catalytic reaction, catalyzed by a metal carbonate, bicarbonate or hydroxide, of β-acyloxy-α,α-disubstituted-propionic acids is essentially different from the known methods employing expensive materials and may be advantageously carried out in a continuous manner using a simple apparatus. Furthermore, the present process may be simply and economically practiced on an industrial scale and thus is of great industrial value.

The following examples are given for illustration.

EXAMPLE 1

A celite powder (60 mesh) was impregnated with a potassium carbonate aqueous solution and dried to obtain a catalyst powder containing 1% by weight of potassium carbonate. 1.5 g. of the catalyst was packed in a glass tube of 15 mm. in diameter and 250 mm. in length, said catalyst being set at a distance of about 60 mm. from the outlet end of the tube. The reactor was placed in a tubular electric furnace and heated to 300° C. Then, β-formyloxy-α-ethyl-α-phenyl-propionic acid was charged into the reactor at a rate of 5.8 g. cat. min./mmol (a reciprocal of the charged material in millimole per minute per gram of the catalyst) from an evaporator together with nitrogen gas. The pressure within the reactor was 10 mm. Hg. The gaseous product discharged from the glass tube reactor was cooled with air and then liquefied and collected in a trap cooled with a Dry Ice-methanol cooling medium. The product mixture collected in the trap was distilled and a fraction boiling at 105° C./1 mm. Hg was collected. The elementary analysis of the product disclosed that it is α-ethyl-α-phenyl-β-propiolactone. The gas-chromatographic analysis of the product mixture collected in the trap disclosed that the by-product was formic acid. The yield of α-ethyl-α-phenyl-β-propiolactone was 82.5%.

EXAMPLE 2

The procedure of Example 1 was repeated except that sodium carbonate was used instead of potassium carbonate and β-acetoxy-α,α-dimethyl propionic acid was fed into the reactor at a rate of 6.1 g. cat. min./mmol and the reaction product mixture collected in the trap was distilled to obtain a fraction of 45° C./10 mm. Hg. The product thus obtained was, according to elementary and infrared absorption analysis, α,α-dimethyl-β-propiolactone. The by-product was acetic acid. The yield of the propiolactone was 88.5%.

EXAMPLE 3

The procedure of Example 2 was repeated except that β-acetoxy-α,α-diethylpropionic acid was used instead of β-acetoxy-α,α-dimethyl propionic acid with various catalysts and the reaction product mixture collected in the trap was distilled to obtain a fraction of 78° C./7 mm. Hg. In each case, α,α-diethyl-β-propiolactone was obtained. The yields under the various catalysts are shown in the following table.

| Catalyst carbonate: | Yield (percent) |
|---|---|
| Lithium carbonate | 84.2 |
| Rubidium carbonate | 77.5 |
| Cesium carbonate | 80.5 |
| Calcium carbonate | 72.0 |
| Barium carbonate | 70.0 |
| None | 4.4 |

EXAMPLE 4

The procedure of Example 1 was repeated except that celite and potassium carbonate were replaced by pumice and sodium hydroxide respectively and β-formyloxy-α-methyl-α-butylpropionic acid was fed at a rate of 5.2 g. cat. min./mmol. The reaction product mixture collected in the trap was distilled to obtain a fraction of 60° C./1.5 mm. Hg. The elementary analysis of this product disclosed that it is α-methyl-α-butyl-β-propiolactone. The yield was 47.2%.

EXAMPLE 5

A reactor same as Example 1 was used except that pumice containing 1% by weight of potassium hydroxide was employed as the catalyst and the pressure was 20 mm. Hg. To the reactor was fed β-propionyloxy-α,α-dimethylpropionic acid at a rate of 5.7 g. cat. min./mmol. The reaction product mixture collected in the trap was distilled to obtain a fraction of 45° C./10 mm. Hg. The elementary analysis of the product disclosed that it is α,α-dimethyl-β-propiolactone. The by-product was propionic acid. The yield of the lactone was 51.2%.

EXAMPLE 6

The procedure of Example 5 was repeated except that potassium hydroxide was replaced by various metal hydroxides, to obtain α,α-dimethyl-β-propiolactone and propionic acid as by product. The yields under different catalysts are shown in the following table.

| Catalyst: | Yield (percent) |
|---|---|
| Li(OH) | 54.2 |
| Rb(OH) | 44.4 |
| Cs(OH) | 50.2 |
| Sr(OH)$_2$ | 36.5 |
| Ba(OH)$_2$ | 40.1 |
| Ca(OH)$_2$ | 51.2 |
| None | 3.5 |

EXAMPLE 7

A celite powder (60 mesh) was impregnated with a sodium hydrogen carbonate aqueous solution and dried to obtain a catalyst powder containing 0.1% by weight of sodium hydrogen carbonate. 1.5 g. of the catalyst was packed in a glass tube of 15 mm. in diameter and 250 mm. in length, said catalyst being set at a distance of about 60 mm. from the outlet and of the tube. The reactor was placed in an electric furnace and heated to 290° C. Then, β-acetoxy-α,α-dimethylpropionic acid was fed into the reactor at a rate of 0.5 g. cat. min./mmol. from evaporator together with nitrogen gas. The pressure within the reactor was 10 mm. Hg. The gaseous product discharged from the glass tube reactor was cooled with air and then liquefied and collected in a trap cooled with a Dry Ice-methanol cooling medium. The product mixture collected in the trap was distilled to obtain a fraction of 45° C./10 mm. Hg. The analysis of the product disclosed that it is α,α-dimethyl-β-propiolactone. The by-product was acetic acid. The yield of the β-lactone was 95.2%.

EXAMPLE 8

A pumice powder in an amount of 2.4 g. and containing 0.3% by weight of potassium hydrogen carbonate was packed in the same reactor and in the same manner as in Example 7. The reactor was heated to 280° C. in a furnace and adjusted to 10 mm. Hg. β-Acetoxy-α,α-diethylpropionic acid was fed into the reactor at a rate of 0.55 g. cat. min./mmol. The gas-chromatographic analysis of the mixture collected in the cooling trap disclosed that α,α-diethyl-β-propiolactone was produced with acetic acid as the by-product. The yield of the β-lactone was 92.5%.

EXAMPLE 9

The procedure of Example 7 was repeated but with various other hydrogen carbonates, to obtain α,α-dimethyl-β-propiolactone. The results are shown in the following table.

| Catalyst: | Yield (percent) |
| --- | --- |
| Rubidium hydrogen carbonate | 84.5 |
| Cesium hydrogen carbonate | 83.2 |
| None | 3.4 |

What we claim is:

1. A method for producing an α,α-disubstituted-β-propiolactone of the formula:

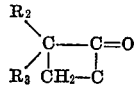

wherein $R_2$ represents an alkyl group of 1–4 carbon atoms and $R_3$ represents a group selected from the group consisting of alkyl groups of 1–4 carbon atoms and phenyl group, which comprises thermally decomposing a β-acyloxy-α,α-disubstituted propionic acid of the formula:

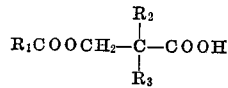

wherein $R_1$ represents a member selected from the group consisting of hydrogen atom and alkyl groups of 1–2 carbon atoms, in the presence of a catalyst selected from the group consisting of (a) lithium, sodium, potassium, rubidium, cesium, strontium, barium and calcium carbonates; (b) lithium, sodium, potassium, rubidium, cesium, strontium, barium and calcium hydroxides and (c) sodium, potassium, rubidium and cesium bicarbonates.

2. A method as claimed in claim 1 in which the thermal decomposition is conducted at a temperature of 100–500° C., preferably at 200–400° C.

3. A method as claimed in claim 1 in which the thermal decomposition is conducted at a pressure of 1–760 mm. Hg, preferably 5–100 mm. Hg.

4. A method as claimed in claim 1 in which the thermal decomposition is conducted in the presence of an inert carrier gas.

References Cited

FOREIGN PATENTS 1,478,258 3/1967 France.

ALEX MAZEL, Primary Examiner

ANNE MARIE T. TIGHE, Assistant Examiner

U.S. Cl. X.R.

252—475; 260—488